United States Patent [19]
Stone et al.

[11] Patent Number: 6,101,510
[45] Date of Patent: Aug. 8, 2000

[54] WEB BROWSER CONTROL FOR INCORPORATING WEB BROWSER FUNCTIONALITY INTO APPLICATION PROGRAMS

[75] Inventors: Jeremy D. Stone, Bellevue; Michael G. Sheldon, Seattle; Kurt J. Eckhardt, Redmond, all of Wash.

[73] Assignee: Microsoft Corporation, Redmond, Mass.

[21] Appl. No.: 08/790,474

[22] Filed: Jan. 29, 1997

[51] Int. Cl.[7] .................................................. G06F 17/21
[52] U.S. Cl. ............................................................ 707/513
[58] Field of Search ........................ 395/200.32, 200.48; 707/10, 513; 706/11; 345/357

[56] References Cited

U.S. PATENT DOCUMENTS

| | | | |
|---|---|---|---|
| 5,572,643 | 11/1996 | Judson | 395/200.48 |
| 5,721,908 | 2/1998 | Lagarde et al. | 707/10 |
| 5,774,123 | 6/1998 | Matson | 345/357 |
| 5,778,372 | 7/1998 | Cordell et al. | 707/513 |
| 5,793,964 | 8/1998 | Rogers et al. | 395/200.32 |
| 5,799,292 | 8/1998 | Hekmatpour | 706/11 |
| 5,809,247 | 9/1998 | Richardson et al. | 395/200.48 |
| 5,838,906 | 11/1998 | Doyle et al. | 395/200.32 |

OTHER PUBLICATIONS

*The Definitive Client Interface Reference.*
Tutorial D Writing Web Software through Client APIs (Mosaic CCI, Netscape), Tom Magliery, Briand Sanderson, Fourth International World Wide Web Conference, Dec. 11, 1995.
*Netscape's DDE Implementation*, Version 0x00010000, Mar. 22, 1995.

*Primary Examiner*—James P. Trammell
*Assistant Examiner*—John Leonard Young
*Attorney, Agent, or Firm*—Klarquist Sparkman Campbell Leigh & Whinston LLP

[57] ABSTRACT

A web browser control allows application program developers to incorporate web browser functionality into application programs. The web browser control exposes web browsing functionality to application programs through an application program interface. This interface comprises member functions, events and properties. The member functions provide high level services such as Navigate to a URL, go forward or backward in a navigation stack, or refresh the display of an HTML page. The events are notification messages that the control sends to a host application to notify the application about actions that have taken place or are about to take place. The properties provide status information about an instance of a control. A host application can create several instances of the web browser control and communicate with them through the interface on each instance.

21 Claims, 5 Drawing Sheets

WEB BROWSER CONTROL FOR INCORPORATING WEB BROWSER FUNCTIONALITY INTO APPLICATION PROGRAMS

FIELD OF THE INVENTION

The invention generally relates to computer software for browsing computer networks such as the Internet or an intranet. More specifically, the invention relates to software to incorporate web browsing functionality into application programs.

BACKGROUND OF THE INVENTION

The Internet is a vast, world wide collection of computer networks, including millions of computers. Every day the information content and number of users accessing the Internet grows. The popularity and power of the Internet has even spawned new forms of computer networks called Intranets that apply the networking and information content standards used on the Internet to networks for organizations.

With this intense focus on the Internet and Internet-related standards, there is an increasing demand for applications that can access the Internet and take advantage of Internet related standards. This demand for Internet-enabled applications is making the Internet and Internet standards a key platform for new application software development.

A particularly important part of the Internet is the World Wide Web. The World Wide Web is comprised of a number of computers scattered throughout the Internet that provide information in the form of graphical documents called Web pages. The growth of the Internet, and particularly the World Wide Web, have accelerated the development of new standards and programming languages for creating content for the World Wide Web such as the Hyper Text Markup Language (HTML), the Virtual Reality Modeling Language (VRML), the Java™ programming language, and scripting languages developed for use in HTML documents.

From a user's point of view, access to the Internet and its services typically are accomplished by invoking a network application program such as a network browser. The network application program acts as an interface between the user and the Internet. Network application programs are typically "client" applications that accept commands from the user and obtain Internet data and services by sending requests to "server" applications on other computers at other locations on the Internet.

While there are a number of different types of network application programs, perhaps the most important application for retrieving and viewing information from the Internet is the network browser. The network browser is commonly referred to today as a web browser because of its ability to retrieve and display Web pages from the World Wide Web. Some examples of commercially available browsers include the Internet Explorer® by Microsoft Corporation of Redmond, Washington, Netscape® Navigator by Netscape Communications of Mountain View, California, and Mosaic developed at NCSA, University of Illinois.

To retrieve information from computers on the Internet, web browsers send network requests via the File Transfer Protocol (FTP), Simple Mail Transfer Protocol (SMTP), Hyper Text Transfer Protocol (HTTP), Gopher document protocol and others. A web browser and server applications use these network requests to exchange data across the Internet, or some other computer network HTTP is a protocol used to access data on the World Wide Web. In particular, web browsers use HTTP to retrieve documents created in the HTML from Web servers on the Internet, in intranets, or from the user's own local file system on the hard drive. The location of resource such as an HTML document is defined by an address called a URL ("Uniform Resource Locater"). Web browsers use the URL to find and fetch resources from the Internet and the World Wide Web.

HTML allows embedded "links" to point to other data or documents, which may be found on the local computer or other remote Internet host computers. When the user selects an HTML document link, the web browser can retrieve the document or data that the link refers to by using HTTP, FTP, Gopher, or other Internet application protocols. This feature enables the user to browse linked information by selecting links embedded in an HTML document. A common feature of web browsers is the ability to save navigation history so that the user can move forward and backward across the Web pages that he or she has already retrieved.

As new standards are developed to make the content of Web pages more compelling, Web browsers have been upgraded to support them. This has made the Web browser the key application for accessing information from the Internet and from networks based on Internet standards. At the same time, the amount of expertise needed to create a fully functional browser has made it difficult for developers to create new applications that can take advantage of new forms of Web content developed for the Internet.

With the growing complexity of the browser, it is not possible for typical developers to incorporate the functions of a Web browser into their applications. Rather than attempt to make a Web browser, one alternative for the application developer is to try to build an application program that launches a stand-alone Web browser, running in the same machine as the application program, to provide access to Web content.

One way to accomplish this is to use the features of a multi-tasking operation system like the Windows® operating system to launch a stand-alone browser from within the application program. In this approach, the application program issues a command to the operating system to launch the Web browser. This is not an adequate solution in many cases because ii does not give the application program control of specific functions within the Web browser. Once the operating system has launched the Web browser, the application is no longer in control. The application program has a limited ability, it any, to control how the Web browser retrieves Web content, how the browser interacts with the Web content, and how the Web browser presents the Web content to the user. In particular, the application program cannot instruct the Web browser to navigate to a series of different Web sites and retain navigation history, it cannot access the content within a Web page such as a script program, and it cannot control or alter how the Web browser presents the content of a Web page or several Web pages.

Some stand-alone browsers attempt to address these limitations by supporting an interface for Dynamic Data Exchange (DDE) called the Spyglass DDE interface. This DDE interface makes it possible for a separate application program to automate a stand-alone web browser in a limited way. Through this interface, however, the Web browser always appears as a separate application with a separate window including all of its own user interface controls. Since the stand-alone web browser is displayed in a separate window, it can become hidden behind other windows in a windowing user interface.

SUMMARY OF THE INVENTION

The invention provides a method for making a web browser directly accessible to the code of an application program. In one implementation of the invention, a software object called a web browser control exposes web browser functionality to application programs through an application programming interface. This interface is comprised of member functions, events and properties that enable the code of an application to interact with a web browser. The web browser control makes it easy for program developers to incorporate a web browser or web browser functionality into an application program.

The programming interface of the web browser control gives applications programmatic access to browser functions. The interface member functions include high level services such as "navigate to a specified URL", "refresh the display of an HTML page", or "move one page forward or backward in the navigation history." The interface events allow the browser control to notify a host application program when certain actions occur and give the application the opportunity to take some action in response to an event. Finally, the properties convey state information about a browser control such as the URL of the page that it is currently processing, whether it is currently busy navigating to a web page, and the title of the current Web page.

When developing an application, the program developer incorporates a web browser control by writing application code that interacts with a browser control through the browser control interface. In one implementation of the browser control, the browser control interface is implemented in a server program that is dynamically linked with the application program at runtime. To use the services of a web browser control, the application instructs the server to create an instance of a web browser control. The application interacts with an instance of a browser control by invoking member functions and receiving notification messages through the browser control's interface for that instance. The web browser control encapsulates the data for browsing operations, including the URL of a Web page, a navigation stack and the HTML content of the page.

The application supports the presentation of the web browser control on the display of the computer by creating a window for an instance of the control. The instance of the control displays its output and interacts with the user through a frame, which it displays in the window created by the host application.

The web browser control supports a number of interesting features that are difficult, if not impossible, to implement using a stand-alone browser application. One feature is the ability of an application to control specific aspects of a navigation to a URL and of a presentation of an HTML page through the events of the browser control. The browser control, for example, fires an event before it navigates to a URL and when it completes navigation. It also fires an event in cases where a new window might need to be created to display the results of a navigation. These events give the application the opportunity to control the navigation to a Web page and to control the presentation of the web page in a window of the application.

In one implementation, the level of the encapsulation of the web browser is such that it is easy for applications to re-use the web browser control. The host application does not need to know any details about how the web browser control provides its web browsing services. For example, the host application does not have to create or maintain a navigation stack because the web browser control manages the navigation stack.

While the web browser control is easy to re-use, it also provides detailed information about a navigation to the host application so that the host can perform more complicated tasks. In one implementation, for example, detailed information can be passed to the methods and events in the browser control interface such as a URL, a target frame name, post data, and HTTP headers. This enables the host application of the browser control to tightly control navigation to a Web page and control the presentation of the Web page in a frame selected by the host application. For example, the host application can get the target frame name and URL from an event fired as the browser is about to navigate to the URL and redirect the navigation to another window.

Another feature of the browser control is the ability of the application to create more than one instance of a web browser control. This enables the application to display two web pages simultaneously. The instances of the browser controls are designed such that they can communicate directly without getting the host application involved. For example, a targeted navigation in one browser control can directly cause output in another browser control without requiring the application to handle the communication between the two browser controls.

Another feature is the ability of the application to get access to the content of a Web page and alter its presentation. For example, an application can ask a browser control to retrieve a web page. The application can then add additional HTML content or script code to change the way the HTML page appears to the user on the display screen.

Further advantages and features will become apparent with reference to the following detailed description and accompanying drawings.

DETAILED DESCRIPTION

1. Computer Overview

Figure 1:
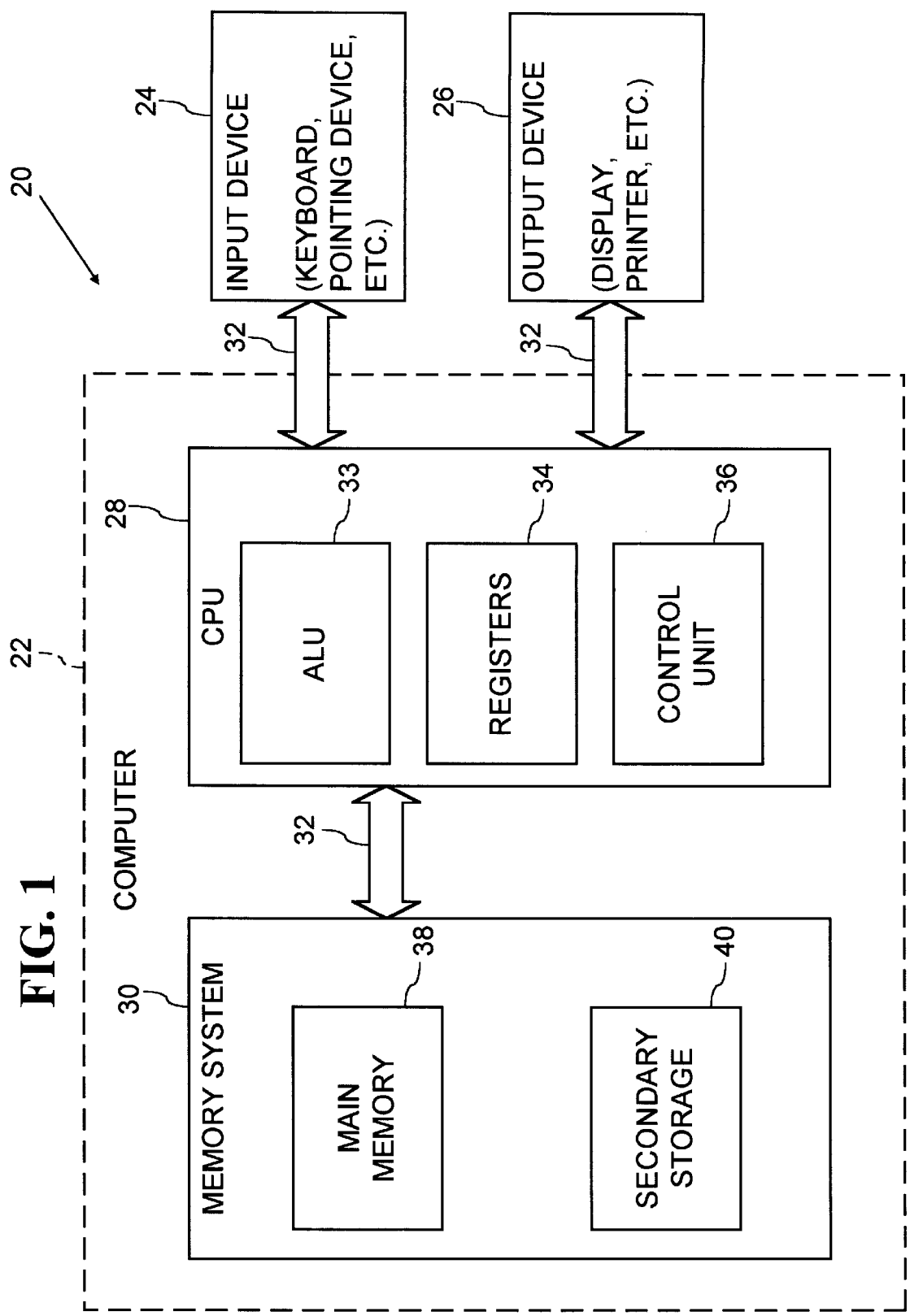
FIG. 1 is a general block diagram of a computer system that serves as an operating environment for a web browser control and the application program software that uses it.

FIG. 1 is a general block diagram of a computer system that serves as an operating environment for a web browser control and the application program software that uses it. The computer system 20 includes as its basic elements a computer 22, one or more input devices 24 and one or more output device 26 including a display device.

Computer 22 has a conventional system architecture including a central processing unit (CPU) 28 and a memory system 30, which communicate through a bus structure 32. CPU 28 includes an arithmetic logic unit (ALU) 33 for performing computations, registers 34 for temporary storage of data and instructions and a control unit 36 for controlling the operation of computer system in response to instructions from a computer program such as an application or an operating system. The computer can be implemented using any of a variety of known architectures and processors including an x86 microprocessor from Intel and others, such as Cyrix, AMD, and Nexgen, and the PowerPC from IBM and Motorola.

Input device 24 and output device 26 are typically peripheral devices connected by bus structure 32 to computer 22. Input device 24 may be a keyboard, pointing device, pen, joystick, head tracking device or other device for providing input data to the computer.

The output device 26 represents a display device for displaying images on a display screen as well as a display controller for controlling the display device. In addition to the display device, the output device may also include a printer, sound device or other device for providing output data from the computer.

Some peripherals such as modems and network adapters are both input and output devices, and therefore, incorporate both elements 24 and 26 in FIG. 1.

Memory system 30 generally includes high speed main memory 38 implemented using conventional memory media such as random access memory (RAM) and read only memory (ROM) semiconductor devices, and secondary storage 40 implemented in media such as floppy disks, hard disks, tape, CD ROM, etc. or other devices that use optical, magnetic or other recording material. Main memory 38 stores programs such as a computer's operating system and currently running application programs. The operating system is the set of software which controls the computer system's operation and the allocation of resources. The application programs are the set of software that performs a task desired by the user, making use of computer resources made available through the operating system. In addition to storing executable software and data, portions of main memory 38 may also be used as a frame buffer for storing digital image data displayed on a display device connected to the computer 22.

The operating system commonly provides a number of functions such as process/thread synchronization, memory management, file management through a file system, etc. The implementation of the browser control described below is designed to execute on a computer running the Windows® 95 Operating System from Microsoft.

Below we describe software implementations of the web browser control in some detail. This software can be implemented in a variety of programming languages, which when compiled, comprises a series of machine-executable instructions stored on a storage medium readable by a computer ("computer readable medium"). The computer readable medium can be any of the conventional memory devices described above in connection with main memory and secondary storage.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the computer industry.

2. The Browser Control

The invention is implemented in the form of a re-usable browser control that provides the functionality of a web browser to application programs. The browser control is a software object that encapsulates the functions of a web browser and exposes its functionality through a programming interface. The browser control is re-usable in the sense that programmers can incorporate this control as often as they want in application programs.

The browser control's programming interface is comprised of member functions (also referred to as "methods"), properties, and events. The member functions or methods of the browser control are function, that application programs can call to invoke the services of the browser. The browser control provides these functions in the form of high level requests for browsing services much like the user might see in the user interface of the browser. These methods include Navigate, GoBack, GoForward, GoHome, GoSearch, Refresh and Stop. These functions are summarized briefly in Table 1 and described in full further in this description.

TABLE 1

| Name of Member | Description |
| --- | --- |
| Function | |
| Navigate | This method retrieves a resource (typically an HTML document) at a specified URL. The application can request the following optional services: display the document in a new window, save the URL on a navigation stack, and write the document to a local disk cache. |
| GoBack | This method retrieves the previous page on the navigation stack. |
| GoForward | This method retrieves the next page on the navigation stack. |
| GoHome | This method retrieves the home page, which is typically set by the user in a dialog box. |
| GoSearch | This method retrieves a search page as specified by the user in a dialog box. |
| Refresh | There are actually two versions of this method in this implementation, Refresh and Refresh2. The basic function of these methods is to refresh or reload the current page. In the second version, the application can specify the extent of the refresh by passing certain parameters when invoking this method. |
| Stop | This method stops any navigation (fetching of an HTML document) and stops any dynamic page elements currently being played back. |

The events in the control's programming interface are notification messages generated by the control when certain actions are about to or have taken place. The events in one implementation of the browser control are summarized briefly in Table 3 and described in full further in this description.

TABLE 2

| Name of Event | Description |
| --- | --- |
| Before Navigate | The browser control fires this event when it is about to navigate to a different URL. |
| NavigateComplete | The browser control fires this event when it has successfully completed navigating to a URL. |
| NewWindow | The browser control fires this event when a new window might be needed. In this implementation, this can occur: 1) when the user hits the shift key while clicking on a link, 2) when the user right clicks on a link and chooses the "New Window" option in a pop-up menu, or 3) when the application has requested the control to display the page in a specified frame and this frame does not exist yet. |
| StatusTextChange | The browser control fires this event when the status text for the control changes. |

TABLE 2-continued

| Name of Event | Description |
| --- | --- |
| ProgressChange | The browser control fires this event when the progress of a download changes. |
| DownloadBegin | The browser control fires this event shortly after the BeforeNavigate event, when the navigation is beginning. The application can use this event to trigger the display of a "busy" signal to indicate that the browser control is processing the current request to fetch a page. |
| DownloadComplete | The browser control fires this event when the current attempt to fetch a document is complete, is halted, or fails. |
| TitleChange | The browser control fires this event when the title of a document being processed changes. When downloading an HTML document, the browser control uses the document's URL as the title. As soon as the browser control has parsed the HTML document, including its actual title, it fires this event to indicate that the title has changed and to provide the name of the title from the document. |
| CommandStateChange | The browser control fires this event when the host application should disable "forward" and "backward" navigation controls. In stand-alone browsers, these controls are typically implemented on a tool bar a) region typically displayed at the border of an application's window that contains user interface controls such as buttons, list boxes, etc.). One way to visually indicate that a button make the button is disabled is to appear gray on the display screen. A parameter of this event indicates whether forward or reverse navigation is not available. Note, the host application does not require "forward" and "backward" navigation controls to use this event, this is just one typical use of the event. |

The properties of the web browser control provide descriptive information about the state of a browser control. The application program can ask the control to return this information by making a request on the control's interface and specifying the name of the property. Properties can be read-only, read-write, or write only as defined by the control writer. In the implementation described here, the properties are read-only.

Table 3 summarizes the properties in one implementation.

TABLE 3

| Property Name | Description |
| --- | --- |
| LocationName | The title of the current document in the browser control. |
| LocationURL | The current URL of the browser control. |
| Busy | A boolean value indicating whether the browser control is currently fetching a document. |
| Document | This specifies the automation interface for the document encapsulated in the Web browser control. Typically, this is an HTML document. This implementation allows the web browser control to encapsulate other types of documents such as a word processing document and provides access to the document through an automation interface for that document type. |
| Application | This specifies the automation interface for the application hosting the Web browser control. |
| Parent | This specifies the automation interface of the form (if applicable) on which the control is located |
| Container | This specifies the automation interface of the OLE container of the control. OLE containers are described in more detail below. |
| TopLevelContainer | This is a boolean value indicating whether the Web browser control is the top-most container. Since the browser control always has a parent (e.g., a |

TABLE 3-continued

| Property Name | Description |
| --- | --- |
| | container application that hosts it) this value is always false in the OLE implementation. The relationship between OLE containers and OLE controls is described further below. |

To incorporate a web browser control in an application, the application developer includes code in the application that uses the browser control's interface to control the operation of and interact with a web browser control. The developer uses the methods, properties and events of the programming interface to define how the application will interact with a control. The browser control's interface is implemented in a program called a "server." In one implementation of the browser control, this server program is linked with the application at runtime. The server program includes an implementation of the member functions and also includes support for creating an instance of a control, and for communicating properties and events for an instance of a control to a host application program.

At runtime, an application asks the server to create an instance of the web browser control. Once the server has created this instance, it gives the application the location of the control by giving it a pointer to the instance of the control. The application can then request browser services by using the methods, properties and events of the browser control for this particular instance. This architecture enables an application to create and control more than one instance of a browser control. For example, an application can display two different HTML documents at once by asking the server to create two instances of the browser control and then invoking the navigate method on the interface of each instance of the control. Each instance of the control has its own data such as the URL of the HTML document, and the HTML contained in the document. In addition, each instance generates its own events.

Figure 2:
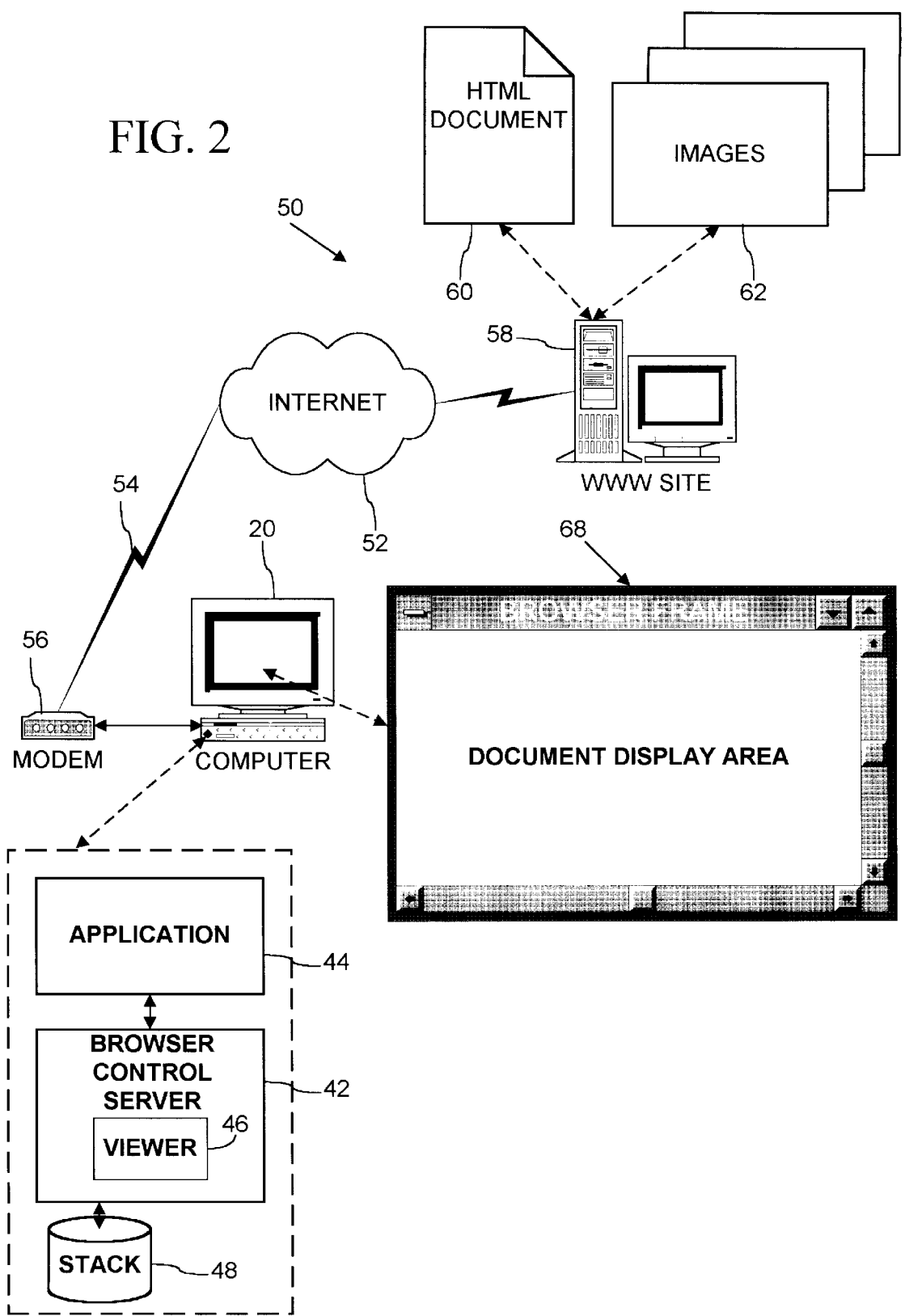
FIG. 2 illustrates an example of how an application program uses a browser control to fetch and display HTML documents.

FIG. 2 illustrates an example of how an application uses a browser control to fetch and display HTML documents. In this implementation, the browser control server program 42 is implemented as a dynamic link library (DLL) and is dynamically linked with each application program (such as application program 44) that uses a browser control. The server program 42 also includes a hypertext viewer 46, which is responsible for parsing and renderings an HTML document into a frame in the computer's display screen.

Before it can fetch an HTML document, the application program must first create an instance of a browser control. To accomplish this, the application program asks the server to create an instance of the control and return a pointer to it. Once this is complete, the application can request any of the services of the browser control by invoking the methods on the browser control's interface.

For example, to navigate to a specified URL, the application program calls the Navigate method on the browser control's interface and provides the URL of the document that it wants to retrieve. When invoking the Navigate method, the application can also specify a target frame name (the name of the frame to display the results of the navigation), HTTP post data, and HTTP headers. Just before it begins to navigate to the specified URL, the Navigate method in the server program fires the BeforeNavigate event. The Navigate method then proceeds to establish a connection with a Web server program running in a remote computer. The Navigate method establishes a TCP/IP connection with the remote computer and issues a request for the document stored at the specified URL by issuing an HTTP request to the server. As it begins to establish the connection with the Web server, the Navigate method fires the DownloadBegin event.

In this example, the computer 20 is connected to the Internet 52 over a telephone line 54 with a modem 56. Other physical connections can be used in the alternative, such as an ISDN, T1 or like high speed telephone line and modem, a television cable and modem, a satellite link, an optical fiber link, an Ethernet or other local area network technology wire and adapter card, radio or optical transmission devices, etc.

The URL provided by the application refers to an HTML document 60 stored in a remote computer 58 connected to the Internet. An addition to HTML code, this document can incorporate other information content 62, such as images, audio, video, executable programs, etc. (shown as "images" 62), which also reside at the remote computer 58. The document 60 and images 62 are stored as files in a file system of the remote computer 58. The document 50 incorporates the images 62 using HTML tags that specify the location of files or other Internet resource containing the images on the Internet 52.

As the server program 42 downloads the HTML document and related content, it fires ProgessChange events so that the application 44 will know the progress of the download. It also fires StatusTextChange and TitleChange events as appropriate to indicate changes in status and the title of a document.

When the browser control has successfully navigated to the specified URL, it fires the NavigateComplete event. At this point the document or images incorporated into the document may still be downloading. However, the browser control has received at least part of the document and has requested the hypertext viewer 46 to render and display the HTML document.

To display the document 60, the browser control makes a request to the hypertext viewer 46 to create an instance of a document viewer, which represents the HTML document. This document viewer has a programming interface (specifically a document object interface) through which the browser control manages the display of the document in the designated frame. In response to requests from the browser control, the hypertext viewer 46 parses and renders the HTML code and displays the document and related graphical content in the frame created by the application 44. Preferably, the applicator will have already created the frame by the time the hypertext viewer is invoked to display the current page. In some cases, a target frame may not exist for the current navigation, in which case the browser control will issue a NewWindow event. This gives the application the opportunity to request a new window. In this implementation, the application can create a window by invoking standard Win32® API commands of the Windows® 95 Operating System. If a new window is necessary and the application fails to create a new window, the browser control will create a top level window from the Internet Explorer™ stand-alone application in a separate process.

In the normal case where the application creates the target window, the user interface of the browser control appears on the display screen as the rectangular frame in which the document is displayed and a vertical scroll bar along the right hand side of the frame. The scroll bar enables the user to scroll through the document if its entire contents cannot be displayed within the frame.

When the server program 42 has completed downloading the document, it fires the DownloadComplete event. At this point, the entire document and related content is available on the user's machine. Once the hypertext viewer has completed rendering the document, the user can view it in the frame of the web browser control. Note that in the case where the application creates a window that serves as the frame of the web browser control, the application controls this window and it is part of the application's user interface. This is in contrast to the DDE interface described in the background section, where the web browser is a stand-alone application which runs in its own window. In the context of the DDE interface, the web browser application runs in a separate window from the window or windows of the application that is accessing the stand-alone browser application through the DDE interface.

While this diagram specifically refers to the Internet, the browser control can browse other public or private computer networks, such as a computer network of a commercial on-line service or an internal corporate local area network (LAN), an intranet, etc. The browser control can browse documents stored on a remote computer connected to the computer network 52, such as a world-wide web site on the Internet, and can browse documents in the file system stored in the computer's secondary storage 42 (FIG. 1).

In one implementation of the invention, the browser control 42 and hypertext viewer 46 shown in FIG. 2 are software objects which conform to Microsoft Corporation's Component Object Model (COM), and support various ActiveX® (also known as Object Linking and Embedding ("OLE")) interfaces. Specifically, the browser control and the hypertext viewer are implemented as in-process COM classes. The term "in-process" means that the browser control and the hypertext viewer are implemented as DLLs, which are linked with a client application at runtime.

The browser control acts as both a COM class object (a COM server program) and an OLE container. It is a "container" in OLE terminology because it serves as a DocObject host. Namely, it hosts the hypertext viewer 46, which is implemented as an OLE DocObject. As an OLE container and DocObject host, the browser control can host any DocObject, including the hypertext viewer 46.

As an OLE control, the browser control can be contained in any application that satisfies the requirements of an OLE container. This means that in order for an application to be an OLE container, it includes code to support certain programming interfaces of an OLE container. Thus, to create a host container for a web browser control in this implementation, the developer writes code that interacts with the browser control's programming interface, and adds additional code to perform the function of an OLE container.

COM, ActiveX® and OLE are object-oriented technologies which provide integration and inter-operability between separate software components. For a detailed discussion of OLE see Inside OLE, Second Edition by Kraig Brockschrnidt, Microsoft Press, Redmond, Wash. 1995. A brief overview of objects in OLE and associated terminology is provided below before discussing the implementation of the browser control in more detail.

3. Overview of a Software Object

An object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class (which for purposes of OLE are the interfaces of the base class).

Figure 3:
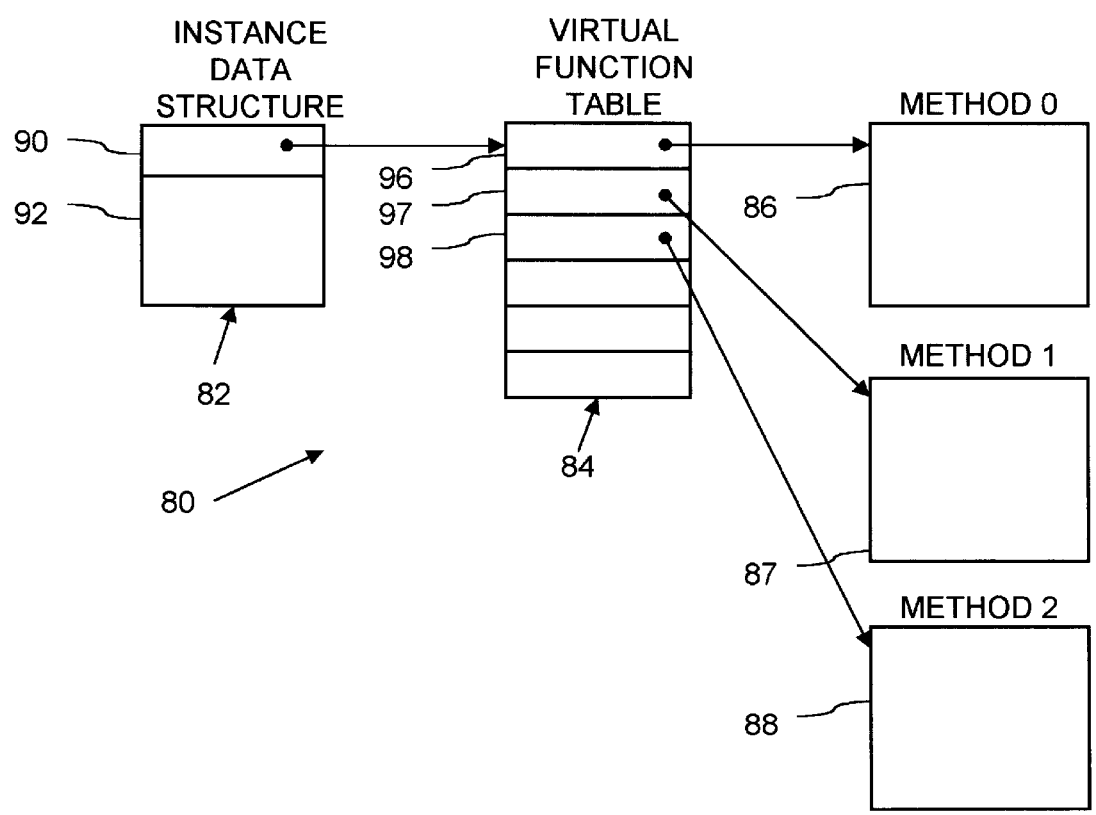
FIG. 3 is a diagram illustrating an example of a server program for a browser control and its relationship with an instance data structure.

Microsoft Corporation's COM specification defines binary standards for objects and their interfaces which facilitate the integration of software components. FIG. 3 is a diagram illustrating an example of a COM server and its relationship with an instance of object data. Applying this diagram to the web browser control, the interface of the web browser control is implemented in a COM server such as the one illustrated in FIG. 3. The instance of object data represents the data encapsulated in an instance of the web browser control.

In a COM implementation, a typical object 80 (such as an instance of a web browser control) is represented in the computer system 20 (FIG. 1) by an instance data structure 82, a virtual function table 84, and member functions 86–88. The instance data structure 82 contains a pointer 90 to the virtual function table 84 and data 92 (also referred to as data members, or properties of the object). A pointer is a data value that holds the address of an item in memory. The virtual function table 84 contains entries 96–98 for the member functions 86–88. Each of the entries 96–98 contains a reference to the code 86–88 that implements the corresponding member function.

The pointer 90, the virtual function table 84, and the member functions 86–88 implement an interface of the object 80. Client programs interact with the object 80 by obtaining a pointer (referred to as an interface pointer) to the pointer 90 of the virtual function table 84. In the case of a web browser control, the client program is an application program that serves as a host container for OLE objects such as the web browser control.

OLE includes a type definition of an interface p)inter which allows client programs to call member functions on the interface by name through the interface pointer and provides type checking on the function's arguments, as expressed in the following code (in the C++ programming language):

Interface→MemberFunction( . . . )

Objects can include multiple interfaces which are implemented with one or more virtual function tables. The member function of an interface is denoted as "IInterfaceName::FunctionName." For instance, in addition to the Web browser control interface introduced above, the web browser control also supports the following interfaces: IOleObject, IOleInPlaceObject, IviewObject2, IOleControl, IDispatch, IConnectionPointContainer, IConnectionPoint, IProvideClassInfo, IPersistStreamInit, IPersistStorage, and IWebBrowser (the IWebBrowser interface is the automation interface of the web browser control discussed in detail in this specification).

An object 80 conforming to the COM specification exhibits data encapsulation by exposing its interfaces (semantic groupings of its member functions) to client programs. The client programs interact with the object 80 by calling the member functions 86–88 on a particular interlace of the object, but do not directly manipulate the object's data. The object 80 also exhibits polymorphism and inheritance in that the object 80 can provide interfaces in common with a base class and other similar objects, so that client programs can interact with each of the objects in the same manner by calling member functions of the interface that the objects have in common.

4. Document Object and Server Overview

Referring still to FIG. 3, the virtual function table 84 and member functions 86–88 of the object 80 are provided by a server application program 100 which is stored in the computer system 20 (FIG. 1) as an executable program file (with a ".exe" file name extension) or as a dynamic link library file (with a ".dll" file name extension). In this particular implementation, the web browser control is implemented as a DLL. In addition, the web browser control acts as a host of the hypertext viewer, which is also a COM server implemented as a DLL. Dynamic link library files are loaded, dynamically linked, and executed by the Windows® operating system in the same process as the client application program. Executable program files are loaded by the operating system as a separately executing process.

In the OLE specification, a server application includes code for the virtual function table 84 (FIG. 3) and member functions 86–88 (FIG. 3) of the classes that it supports, and also includes a class factory that generates the instance data structure 82 (FIG. 3) for an object of the class. For instance, the class factory is the part of the web browser control server program responsible for creating instances of the web browser. The hypertext viewer also includes a class factory for creating instances of the viewer.

A server application can be written by a programmer to support a particular class of object that contains any desired data. More specifically, a programmer can write server applications which provide objects that contain the data of a particular variety of computer document (e.g., document 60 of FIG. 2), such as a text document, spreadsheet, drawing, etc., or that contain data for part of a computer document, such as a range of spreadsheet cells, a paragraph of a text document, etc. These objects which contain document data (and additionally support the document object interfaces described above) are referred to as document objects. (Further details of document object are described in the OLE Document Objects Specifications, publicly available from Microsoft Corp.) For example, software application programs such as the Microsoft® Word word processing program can be written as a server application in which the application program's documents are represented as OLE objects. The hypertext viewer is also designed according to the Document Objects Specifications. The hypertext viewer object encapsulates an HTML page and is responsible for rendering and displaying it in a frame on the display screen.

As noted above, the browser control is a host container for document objects, and specifically is a container for the hypertext viewer. This enables the browser control and other document object containers to interact with the hypertext page through the document object interfaces implemented on the hypertext viewer.

For a client program (e.g., a document object host or container) to interact with the object 80 provided by the server application, the server application must first create the object (i.e., instantiate an object or a class supported by the server application) and the client program must gain an interface pointer to the object 80. In OLE, the client program instantiates an OLE control using services provided by OLE and a set of standard object interfaces defined by COM based on class and interface identifiers assigned to the object's class and interfaces. The services are available to client programs as application programming interface (API) functions provided in the COM library, which is part of a component of the Windows® operating system in a file named "OLE32.DLL." In OLE, classes of objects are uniquely associated with class identifiers ("CLSIDs"). Class identifiers are 128 bit globally unique identifiers ("GUID") that the Programmer creates with an OLE service named "CoCreateGUID" and assigns to the respective classes. The interfaces of an object are associated with interface identifiers ("IIDs").

In particular, the COM library provides an API function, "CoCreateInstance," that the client program can call to request creation of an object to encapsulate a particular document's data using a CLSID associated with the data. The CoCreateInstance API function creates the object and returns a pointer of the requested interface to the client program.

Once the client program has obtained a first interface pointer to the object 80, the client program obtains pointers to other desired interfaces of the object using the interface identifier associated with the desired interface. COM defines several standard interfaces generally supported by OLE objects including the IUnknown interface. This interface includes a member function named "QueryInterface." The QueryInterface function can be called with an interface identifier as an argument, and returns a pointer to the interface associated with that interface identifier. By convention, the IUnknown interface's member functions are included as part of each interface on an object. Thus, any interface pointer that the client program obtains to an interface of the object 80 can be used to call the QueryInterface function.

In a typical situation, however, the only information that the client program has to reference a particular document is a textual name, such as a file name or an Internet URL. In the case of a file name, the COM library provides API functions (e.g., "GetClassFile," "ReadClassStg" and "ReadClassStm") for obtaining a CLSID associated with the file. Client programs also can utilize a system provided object known as a moniker to resolve a name that references a document into an interface pointer on an instantiated object that encapsulates the document's data. These well known mechanisms are described in more detail in Inside OLE, Second Edition, supra.

OLE provides a way to allow programs to manipulate a software object from outside the object called OLE automation. The term "automation" in this context refers to how the OLE object exposes a set of commands or functions that another piece of code can invoke.

In OLE automation, a software object exposes itself as a series of methods, properties and events. A property is an attribute, such as a color, the zip code section or the postal code section of an address, or another object. A method generally refers to a request to an object to perform a specific action. Finally, an event is a notification from an object that something has happened. An event is similar to a method call except that it occurs from the object to its client.

Properties have data types. For example, the postal code section of an address can be a string or a long integer. Properties can also be parameterized, which is useful to construct an array of one type representing a collection of properties (e.g., the lines of an address). In this type of property, a parameter representing an index in the array is defined for the property. Methods can also take parameters and return results.

OLE automation also allows for hierarchies of automation objects by allowing methods and properties to return pointers to other objects. For example a series of related attributes can be represented within an object, which represents each of the attributes as a property.

In OLE, a software object's properties and methods can be exposed to outside applications through 1) a standard OLE interface called IDispatch, and 2) through interface methods and property access functions that applications can call directly. IDispatch provides outside access to an object's methods and properties through one of its methods called the Invoke method. For instance, a program can ask an OLE object to return a property or can call one of its methods by calling the Invoke method on the IDispatch interface of the object and identifying the property or method by its ID. The IDispatch interface includes other methods to enable a program to get an ID of a method or property, and to get data type information. An OLE object can expose methods that can be called directly, rather than through the Invoke method in the IDispatch interface. For example, an OLE object can expose a set of functions that is derived from IDispatch and includes method and property access functions that another program can call directly.

An OLE control is a type of OLE object that uses OLE Automation to expose properties and methods and to provide support for events. An OLE object is typically designed to be incorporated into a host application called a container. In the context of OLE controls, an event is a notification from the control to its container that something has happened. In OLE controls, events are typically implemented as standard OLE automation methods, except that the automation interface for these methods is implemented in the container, not the control. When a control wants to fire an event, it calls the container method associated with the event. For instance, the control can call the proper container method to fire the event through the IDispatch::Invoke method of the container.

An OLE object can tell another object that it is the consumer of the other object's interface through a mechanism known as a connection point. A connection point is an interface exposed by an object that is used to hook up to an implementation of an interface with which the object wants to communicate. In the case of control events, a control describes the event interface in terms of an OLE automation interface in its type library, marking the interface as "source." This means that the control does not implement the interface. The control then provides a connection point through which the container can connect its implementation. A connection point can be defined as an implementation of the IConnectionPoint interface. The container gets the connection point through another interface called IConnectionPointContainer, which allows an external object to iterate through a list of connection points maintained by a control.

While we describe the invention with reference to an OLE control, it is important to note that the invention does not have to be implemented using OLE. Thus, the web browser control is not limited to an OLE control implementation, but rather, can be implemented using other programming techniques.

5. Implementation of the Browser Control

As introduced above, the browser control is implemented as an OLE control and as an OLE container. As an OLE control, the browser control conforms to the COM specification for OLE controls and supports OLE interfaces that enable it to be embedded easily in any application program that serves as an OLE container. A programmer can incorporate a web browser in an application so long as the application implements OLE container interfaces necessary to allow the application to host a web browser control. The web browser is also a container because it hosts the hypertext viewer, a document object. Further details of OLE controls are described in the OLE Control and Control Container Guidelines, publicly available from Microsoft Corp.

In this OLE implementation, the browser control supports the following standard interfaces used for OLE controls: IOleObject, IOleInPlaceObject, IViewObject2, IOleControl, IDispatch, IConnectionPointContainer, and IConnectionPoint.

The browser control also supports the following standard interfaces for DocObject containers: IOleClientSite, IOleDocumentSite, IOleCommandTarget, and IOleInPlaceSite.

In order to act as a host of the web browser control an application program must support the following standard interfaces used for OLE containers: IOleClientSite, IAdviseSink, IOleInPlaceSite, IOleControlSite, IOleInPlaceFrame, IOleContainer, and IDispatch.

6. Browser Control Method Implementation

Below, we describe an implementation of the browser control interface in more detail.

Navigate

HRESULT Navigate([in] BSTR URL, [in, optional] VARIANT * Flags, [in, optional] VARIANT * TargetFrameName, [in, optional] VARIANT * PostData,[in, optional] VARIANT * Headers);

Navigates the browser to the specified URL.

URL—URL to navigate to. If not fully qualified, the URL will be canonicalized and protocol guessed at according to a set of predefined conventions.

Flags—can be a combination of the following:

navOpenInNewWindow—Instructs the browser control to display the results of this navigation in a new window.

navNoHistory—Instructs the browser control not to put this navigation on the navigation stack; The new page will replace the current page in the navigation stack.

navNoReadFromCache—Instructs the browser control not to read from the disk cache for this navigation.

navNoWriteToCache—Instructs the browser not to write the results of this navigation to the disk cache.

TargetFrameName—Points to VARIANT containing BSTR with target frame name if this navigation should take place in a named frame; or an empty VARIANT if the client does not provide a frame name.

PostData—Points to VARIANT containing SAFEARRAY of post data, or an empty VARIANT if no post data. This should be a SAFEARRAY of dimension one with element type VT_UI1 (a vector array of bytes). If no post data is specified the HTTP method will be a GET; if post data is specified the HTTP method will be a POST. This parameter is ignored if the URL is not an HTTP URL.

Headers—Points to VARIANT containing BSTR with additional HTTP headers to use which are added to default headers used in the Internet Explorer 3.0 browser (IE 3.0), or an empty VARIANT if no additional headers. This parameter is ignored if the URL is not an HTTP URL.

Figure 4:
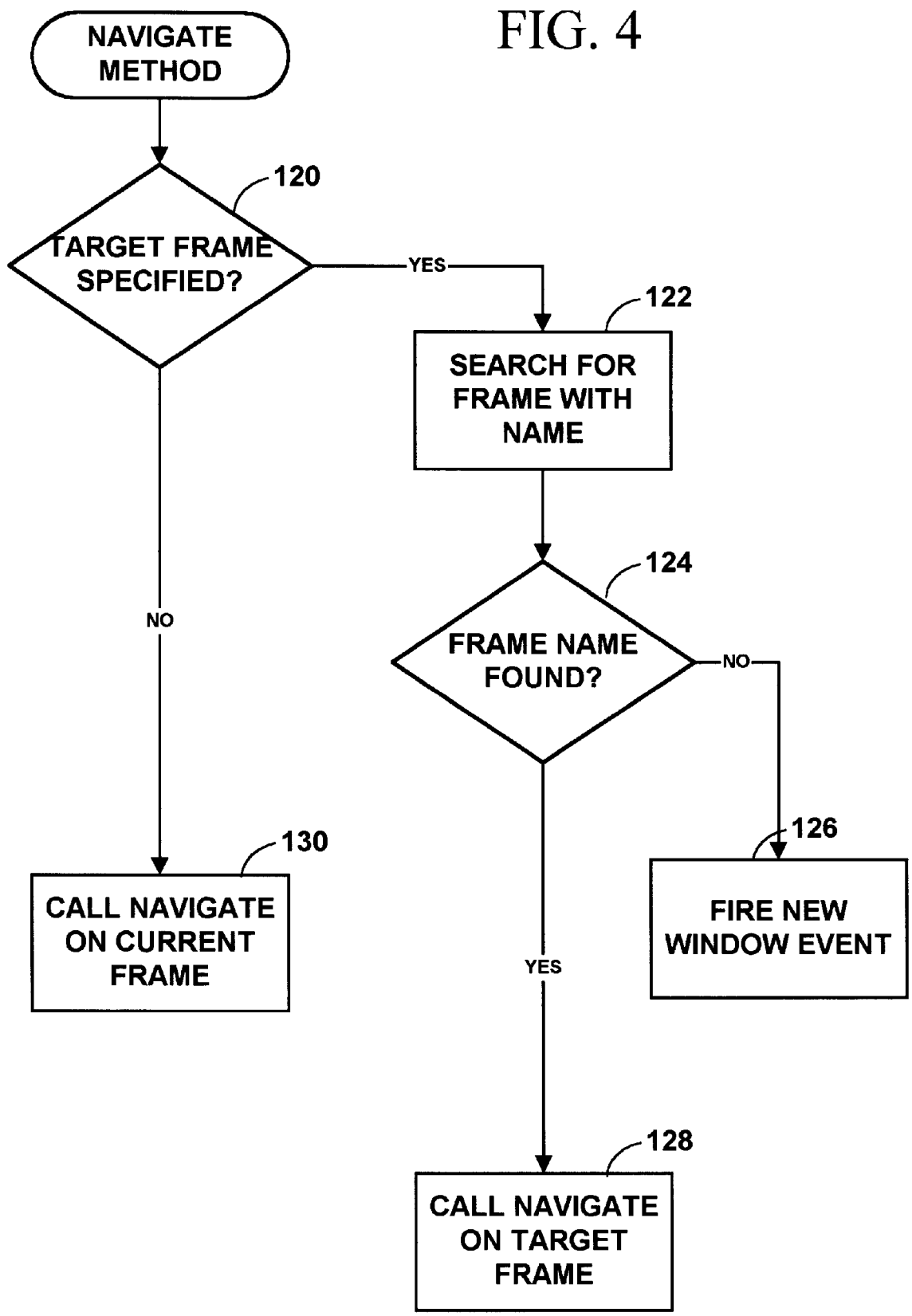
FIG. 4 is a flow diagram illustrating how an implementation of a browser control server initiates a navigate method on an instance of a browser control.
Figure 5:
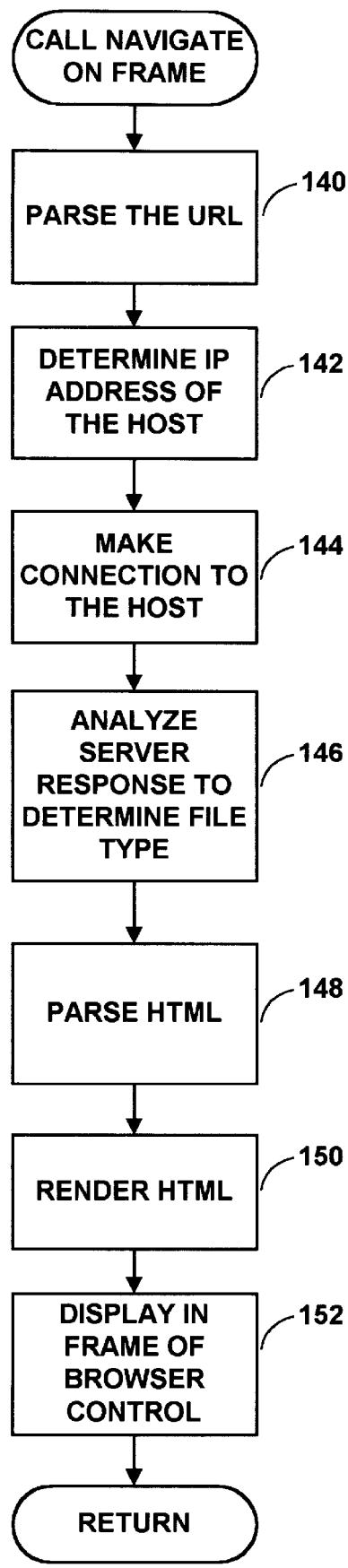
FIG. 5 is a diagram illustrating an implementation of a navigate method in a web browser control server.

FIGS. 4 and 5 are flow diagrams illustrating aspects of the Navigate method. FIG. 4 illustrates how the web browser control server initiates a navigation in two cases: 1) where the host application specifies a target frame and 2) where the host does not specify a target frame. FIG. 5 illustrates the operation of the navigate method, once the browser control server has identified the target frame.

When an application invokes the navigate method, it may or may not specify the target frame name as a parameter to the method. As shown in FIG. 4, the browser control server checks whether the application has specified a target frame name (step 120) when the application invokes the Navigate method on an instance of the browser control. If application does pass a target frame name as a parameter to the call, the server searches for a frame having the specified name (step 122). To accomplish this, the server checks the frame names of browser windows currently executing in the system to find a matching frame name.

If the server cannot find a browser window with the target frame name, it fires a new window event as shown in steps 124 and 126. If the server does find a frame with a matching name, it invokes the navigate method for the instance of the browser control or stand-alone browser that controls that frame as shown in step 128.

In the case where the application does not specify the target frame, the server assumes that the target frame corresponds to the instance of the browser control on which the application made the navigation request. It therefore proceeds to invoke the navigate method on the current instance of the browser control as shown in step 130.

Once the server finds the proper frame, it instructs the corresponding browser control to navigate to the specified URL using the information provided as parameters to the navigate method. FIG. 5 is a flow diagram illustrating an implementation of the navigate method at this point.

As shown in step 140, the navigate method first parses the URL and determines the protocol, host and domain name. For instance, in "http://www.whitehouse.gov/welcome", the protocol is "http", the host name is "www", and the domain name is "whitehouse.gov".

Next in step 142, the navigate method determines the IP (internet protocol) address of the host, typically by using a standard socket call named gethostbyname( ).

The navigate method then makes a connection to the host (step 144), typically by using the standard socket call named connector( ). For HTTP, the navigate method sends a "GET" request to begin receiving data for that URL, and includes relevant HTTP headers to indicate additional information to the server. In the above example, the GET request might be the characters: "GET /welcome HTTP/1.0 Accept: image/gif, image/jpeg, */* Accept-Language: en User-Agent: SomeBrowser".

When the server responds, the navigate method examines its HTTP response headers to determine the file type it is returning (step 146). More specifically, the browser control receives a stream of data from a socket and looks at the Multipurpose Internet Mail Extension (MIME) type from the server and the file extension, and determines which piece of code resident in the computer will be able to interpret the data. For more information on MIME, please see the Internet Standard Document RFC No. 1521. For an HTML document, the piece of code is the HTML viewer object, which is implemented as an OLE document object.

The rest of FIG. 5 assumes that the file type is HTML, however, other conventional file types are possible as well. If the file is an HTML document, the navigate method proceeds to take steps to parse and render the page.

In this implementation, the navigate method creates an instance of an HTML viewer object to represent the HTML document. The browser control access the HTML document through the document object interfaces implemented on the viewer object.

The HTML viewer parses the HTML to determine the layout and appearance of the page, and then renders it to display it within the frame of the browser control (steps 148, 150, 152).

In this version of the browser control, the navigation stack is implemented as a linked list of URLs for each page visited by associated instance of the browser control. Each instance of the browser control encapsulates a navigation stack, which is part of the instance data for an instance of the browser control.
GoBack
HRESULT GoBack( );
Makes the browser navigate back one page in the navigation stack.
GoForward
HRESULT GoForward( );
Makes the browser navigate forward one page in the navigation stack.

To navigate back or forward, the browser control stops displaying the current page and displays the page which was the most recent URL that the user visited. This may be implemented by simply recording each URL that the user visits, and using the above implementation of the navigate method to navigate to the appropriate URL. A better implementation is to keep a memory cache of the parsed HTML for some number of recent pages (typically about 4) in order to facilitate quickly switching between recently accessed pages.
GoHome
HRESULT GoHome( );
Sends the browser to its home page, as specified in the IE 3.0 options dialog and Internet Control Panel.
GoSearch
HRESULT GoSearch( );
Sends the browser to its search page, as specified in the IE 3.0 options dialog and Internet Control Panel.

A "home" page refers to the first page that appears when the browser control is launched, and the "search" page refers to a Web site containing a search engine. The GoHome and GoSearch methods navigate i he browser control to those respective pages. This is functionally identical to calling Navigate on the URLs of those pages. The advantage of these methods is that the host application does not need to know the specific URLs of those Web pages.

The URLs of the Home and Search pages can be pre-programmed into the browser control server or can be made accessible to the end-user through the user interface of a browser control. A preferred implementation of the user interface of the browser control displays a dialog box on the display monitor to allow the user to set document independent properties like the URLs of the home and search pages. Another possible type of user-definable property through the user interface is a document-specific property which enables a browser control to control the appearance of HTML documents. For example, an instance of the browser control could take a user specified color for anchors, entered as selection from a list of color "properties" in a dialog box, and merge this property with the document specific attributes specified in the HTML code of the document.

To implement these methods, the browser control uses the navigate method described above to navigate to the appropriate home or search URL.
Refresh
HRESULT Refresh( );
Makes the browser refresh or reload the current page.
Refresh2
HRESULT Refresh2([in,optional] VARIANT * Level);
Makes the browser refresh or reload the current page. Also contains the Level parameter to specify how "hard" to refresh.

Level—Can be one of the following:
refreshAll—performs a fill refresh, including sending a "pragma: no-cache" to the server (for HTTP URLS).
refreshDontSendNoCache—perform a lightweight refresh, does not send "pragma: no-cache" to the server.
Stop
HRESULT Stop( );
Makes the browser stop any navigation, and also stops dynamic page elements (background sounds, etc).

When an application invokes the stop method on a browser control, the browser closes any connections to the server by calling a standard socket function named closesocket( ). The browser control changes the value of the Busy property such that the state of the browser control is no longer "busy.".

7. Implementation of Browser Control Events

A web browser container application implements t he OLE IDispatch interface in order to receive event notification from the web browser control. The web browser control supports the OLE IConnectionPointContainer and IConnectionPoint interfaces, which are used by the container to tell the control that it wishes to be notified about events. It is important to emphasize that the invention does not have to be implemented using these specific OLE interfaces to perform event notification. The events and the notification mechanism used to implement them can be implemented using function calls from the browser control to the client application that do not necessarily adhere to the OLE specification.

In an implementation using the OLE interfaces listed above, the client or "container" requests to receive events from the browser control is as follows. The container application queries for IConnectionPointContainer on the control. It then calls IConnectionPointContainer::FindConnectionPoint specifying DIID_DWebBrowserEvents (which is an identification (ID) for web browser-specific events), and receives an IConnectionPoint which is the "connection point" for the web browser control-specific set of events. It then calls IConnectionPoint::Advise to request notification of events, passing a pointer to its implementation of IDispatch. The browser control keeps a list or table of all the IDispatch pointers which are registered for event notification.

The implementation by which a control notifies a container of an event is as follows. When something occurs for which an event should be fired, the control goes through its list of IDispatch pointers (one per registered recipient of event notification) and calls IDispatch::Invoke on each. It passes a "dispatch identifier", a 32-bit value which identifies which event has occurred, and a variable list of parameters with information about the event (called "variants"). Event notification as described here, IDispatch, dispatch identifiers, and variants are all part of standard OLE automation. They are described in detail in "Inside OLE" by Kraig Brockschmidt and "OLE Controls Inside Out" by Adam Denning.

Below, there is a description of each of the browser control events.
BeforeNavigate
void BeforeNavigate([in] BSTR URL, long Flags, BSTR TargetFrameName, VARIANT * PostData, BSTR Headers, [in, out]boolean * Cancel);
BeforeNavigate is fired when the browser is about to navigate to a different URL.
This may happen as the result of the user clicking on a link, typing in the address bar, external automation, or navigation caused by scripts or HTML code, or other circumstances.

The container has an opportunity to cancel the impending navigation.

URL—the URL being navigated to.

Flags—reserved for future use

TargetFrameName—the name of the frame that this navigation is targeted to (NULL if no named target)

PostData—post data for this navigation if the method is an HTTP POST. The post data is in the form of a SAFEARRAY with one dimension and elements of type VT_UI1 (a vector array of bytes).

Headers—additional HTTP headers for this navigation, if this is an HTTP URL.

Cancel—if the container wishes to cancel this navigation, it should set the value of this boolean to TRUE. Otherwise the navigation will proceed.

NavigateComplete void NavigateComplete([in] BSTR URL);

This event is fired when a navigation has been successfully completed. The document may still be downloading (and in the case of HTML, images may still be downloading), but at least part of the document has beer received from the server and the viewer for the document has been created.

URL—the URL that was navigated to. Note that this can be different than the URL the browser was told to navigate to. One reason is that this URL is the canonicalized and qualified URL; for instance, if the browser was called at Navigate with "www.microsoft.com", the URL passed by NavigateComplete will be "http://www.microsoft.com/". Also if the server has redirected the browser to a different URL, the redirected URL will be reflected here.

NewWindow void NewWindow([in] BSTR URL, [in] long Flags, [in] BSTR TargetFrameName, [in] VARIANT * PostData, [in] BSTR Headers, [in,out] BOOLEAN * Processed);

This event is fired when a new window should be created. Some actions that can cause this are the user shift-clicking on a link, right-clicking on a link and choosing "open in new window", or a targeted navigation to a frame name that does not yet exist. The container has an opportunity to handle the new window creation itself. If it does not, a top-level IE 3.0 window will be created as a separate process.

URL—the URL being navigated to.

TargetFrameName—the name of the frame that this navigation is targeted to (NULL if no named target)

PostData—post data for this navigation if the method is an HTTP POST. The post data is in the form of a SAFEARRAY with one dimension and elements of type VT_UI1 (a vector array of bytes).

Headers—additional HTTP headers for this navigation, if this is an HTTP URL.

Processed—if the container wishes to handle new window creation itself it should set the value of this boolean to TRUE. Otherwise a new top-level window will be created.

The preferred behavior of web browser control containers is to process this event, create a new instance of the web browser control, and pass all the parameters from the NewWindow event directly to the Navigate method on the newly created web browser control. Another option for containers that do not wish to or cannot create a new window is to degrade by performing the navigation in the existing window. To do this, they can process this event and then pass the parameters from this event to Navigate on the existing window.

A "targeted" navigation occurs when a window other than the current window or frame navigates somewhere in response to an event or action. The most common case of this is a frame set where the main window for displaying an HTML code is subdivided into panes. Each of these panes is a separate frame. The author of HTML code can create linked panes in HTML so that when the user clicks on a link in one pane, the other pane navigates to the URL associated with the link that the user just clicked on.

A targeted navigation can occur from anywhere—if a window is created that has the name "foo", any other browser control or instance of the IE3.0 browser in the system can tell "foo" to navigate to a URL.

StatusTextChange void StatusTextChange([in]BSTR Text);

This event is fired when the status text for this browser changes.

Text—status text to use

ProgressChange void ProgressChange([in] long Progress, [in] long ProgressMax);

This event is changed when the progress (barometer value) of a download changes.

Progress—amount of total progress to show, or −1 when progress is complete.

ProgressMax—maximum progress value

To arrive at a percentage progress to show in a progress control, multiply Progress by 100 and divide by ProgressMax (unless progress is −1, at which point the container can show some "done" state or hide the progress UI if it wants.)

DownloadBegin void DownloadBegin( );

This event is fired when a navigation is beginning. This s fired shortly after the BeforeNavigate event, unless the navigation is canceled. Any animation or "busy" indication that the container wants to display should be hooked up to this event.

DownloadComplete void DownloadComplete( );

This event is fired when a navigation is completed, halted, or fails. Unlike NavigateComplete which is only fired when a URL is successfully navigated to, this event will always be fired once a navigation is started. Any animation or "busy" indication that the container wants to display should be hooked up to this event.

TitleChange void TitleChange([in]BSTR Text);

This event is fired when the title of a document in the web browser becomes available or changes. For HTML, the title may change; while HTML is still downloading, the URL of the document is set as the title. After the real title (if there is one) is parsed from the HTML, the title is changed to reflect the actual title.

CommandStateChange void CommandStateChange([in] long Command, [in] boolean Enable);

This event is fired when the current position of the web browser control in the navigation history is such that the browser control cannot navigate forward one position, or when it cannot navigate backward one position in the navigation history. The first parameter indicates which command, either forward or backward, is affected, and the second parameter indicates whether the command is enabled or disabled. In this implementation, the first parameter also has a third value (−1) relating to state changes of OLE commands such as print or cut/paste. This third value indicates whether the IOleCommandTarget toolbar button state has changed (such as print or cut/paste). The docobject such as the HTML viewer sends a notification to the browser control indicating that one of these commands has changed by sending an event (specifically, IOleCommandTarget::Exec(NULL, OLECMDID_UPDATECOMMANDS, . . . )) to the browser control. The browser control maps this event to a CommandStateChange (-1) event and sends it to the host application. The host application should invoke or method implemented in the browser control (specifically called IOleCommandTarget::QueryStatus( )) to update the state of it's toolbar buttons.

8. Implementation of Browser Control Properties

LocationName
HRESULT LocationName([out,retval] BSTR * pbstrLocationName);
Returns the title of the document in the web browser control.
LocationURL
HRESULT LocationURL([out,retval] BSTR * pbstrLocationURL);
Returns the current URL of the web browser control.
Busy
HRESULT Busy([out,retval] boolean *pBool);
Returns TRUE if the web browser control is currently navigating, FALSE otherwise.
Document
HRESULT Document([out,retval] pointer)
Returns a pointer to the automation interface of the viewer object contained in the Web browser control. Typically, this will be the HTML viewer object, but it could be another piece of code that implements a document object interface for a particular type of document such as Microsoft Word for a word processing document.
Application
HRESULT Application([out,retval] pointer)
Returns a pointer to the automation interface of the application hosting the Web browser control.
Parent
HRESULT Parent([out,retval] pointer)
Returns a pointer to the automation interface of the form (if applicable) on which the control is located.
Container
HRESULT Container([out,retval] pointer)
Returns a pointer to the automation interface of the container of the browser control.
TopLevelContainer
HRESULT TopLevelContainer([out,retval] boolean)
Returns a boolean value indicating whether the control is the topmost container of HTML, or if it is contained inside other HTML (such as a frame set).

These properties are stored in the instance data for an instance of the web browser control. When another piece of code (such as the container application) makes a read request on an instance of the browser control, the browser control reads its instance data and returns the appropriate value.

9. Hyperlinking in the Web Browser Control

The Web browser control supports hyperlinking between documents through a set of hyperlinking interfaces implemented on the browser control and the HTML viewer. These hyperlinking interfaces enable the browser control to navigate hyperlinks to different types of documents in addition to HTML documents. However, for the purposes of browsing HTML pages, only the aspects of the hyperlinking interfaces that support hyperlinking to HTML documents is particularly relevant.

Since hyperlinking is implemented within the web browser control, the control can navigate hyperlinks, such as links in HTML documents to other HT documents, without getting the host application involved in the details of hyperlinking. A typical hyperlink navigation proceeds generally as follows. When the user clicks on a link, the browser control calls its own hyperlinking interface. If there is a target frame, the target frame is passed along, with the URL.

The target name originates in HTML—for instance, <A IEF="http://www.microsoft.com" TARGET="foo">Click me!</A> would create a hyperlink that tells frame "foo" to go to www.microsoft.com.

In the preferred embodiment, the browser control implements document object (also known as "ActiveDocument") and hyperlink frame interfaces and behaves as a hyperlink container for viewers for different types of documents other than HTML documents. This feature enables the we) browser control to support hyperlinking in documents other than just HTML documents. This feature is not necessary to implement the invention and need not be implemented if document independence is not desired.

The hyperlinking interfaces are implemented according to the OLE specification and typically include the following architectural features: 1) a hyperlink frame object, 2) a hyperlink container object, and 3) a hyperlink target object. A hyperlink frame object acts as an outer frame that manages one or more hyperlink container documents. In the context of this implementation, the browser control serves as a hyperlink frame object and displays a window on the display screen. In the window, the browser control provides a document viewing user interface in the form of a frame, a user interface control such as a scroll bar, and a document display area. The hyperlink frame object operates as a host or container for document objects provided by a server application, and allows document objects (such as the HTML viewer) to display its document in the document display area on the display screen.

A hyperlink container in this hyperlinking architecture is a document or application that contains hyperlinks. More specifically, the hyperlink container can be a document object (described above) or an object implemented by an application program. Often, hyperlink containers also act as hyperlink targets. For example, the HTML viewer can act as both a hyperlink container, by encapsulating HTML documents that contain hyperlinks, and a hyperlink target, by encapsulating the HTML document that is a target of a hyperlink.

A hyperlink target is a destination of hyperlink navigation. Hyperlink targets can be an object (referred to as a hyperlink target object) that supports an IHlinkTarget interface, an object that supports the IOleObject interface (a well known OLE interface), or a file that can be viewed by launching a viewer application program via the shell execute operating system service as described above. The IHlinkTarget interface is an interface implemented on a target object and used to navigate to a link within a document, which is the target of a hyperlink navigation. A document object such as the HTML viewer does not need to implement this interface, and thus, this interface is not critical to the invention.

In the context of the browser control, the browse control is implemented as a hyperlink frame object. As such, it supports the IHlinkframe::Navigate method that a document object such as the HTML viewer can invoke when it wants the browser control to navigate to a hyperlink. For example when the user clicks on an HTML link in a document, the HTML viewer invokes this navigate method to tell the browser to navigate to the link. While this particular implementation uses the hyperlinking interfaces, it is not necessary to use these interfaces to implement the invention. For more information on the hyperlinking interfaces, please see co-pending U.S. patent application, commonly assigned, entitled OBJECT-ORIENTED FRAMEWORK FOR HYPERLINK NAVIGATION, by Srinivasa R. Koppolu, Victor Stone, Benjamin W. Slivka, David S. Ebbo, Satoshi Nakajima, Clarence Glasse, Richard J. Wolf, filed Dec. 6, 1996.

The browser control enables application programs to access web browser functionality and implement a number of interesting features. One feature is the ability to create applications that can display different web pages simultaneously in separate instances of the web browser control and enable these controls to communicate with each other directly (i.e. without getting the container involved).

The architecture of a browser control supports the display and interactivity of two or more web pages by enabling applications to create two or more instances of the browser control. Consider an example where user input at a first web page causes some output at another, second web page. To support this, the application can create separate instances of the web browser control to display the first and second pages simultaneously. For example, when a user clicks on a hyperlink in the first page, the browser control can fire a newwindow event to tell the application that a new window should be created and to pass it the URL of the hyperlink. The application can then create a new window, make a new instance of the browser control, and call the navigate method with the URL of this hyperlink on the new instance of the browser control.

Once there are separate instances of the web browser control, one instance of the browser control can communicate directly with another instance without getting the container involved. The user can initiate to e communication between web pages by selecting a link in one page that links to and causes some change in output at a second page displayed in a separate frame. This second frame is the target frame because it is the target of the link in the first page.

In response to the user clicking on the link in the first page, the web browser control looks for the target frame to display the results. To accomplish this, the browser control searches for a window associated with an instance of the web browser control having the target frame name. If the browser control finds such a window, it can check the frame name to see if it matches the frame name specified by the link. The browser control only gets the container involved if it cannot find the target frame. In this case, it fires a newwindow event to tell that container that a new window might need to be created.

Another important feature is the ability to expose the machine readable content of a web page to an application so that the application can modify it, alter its presentation on the display screen, or perform additional processing on it. The content available to the programmer of a web page is available to the host application of a browser control because the browser control exposes this content to the application. The container can fetch a web page by calling the navigate method on an instance of the web browser control. It can then add HTML code or scripting language to the page and then invoke the hypertext viewer to render and display the code.

Yet another feature is the ability of the browser control to notify the host container of certain events and perform some default action if the container does not or is unable to respond. One example of this is the newwindow event where the browser control tells the container that a new window should be created. If the container does not respond, the control can create a new instance of the Internet Explorer™ browser and display the results of a navigation using the Internet Explorer™ browser. Alternatively, the container can tell the control to display a new page in the existing frame of the browser control.

While we have described an implementation of the invention in detail, it is important to emphasize that the invention should not be limited to this specific implementation. For example, the architecture is not limited to the specific OLE interfaces and architectures described in detail above. It is not necessary to implement the OLE hyperlinking interfaces to implement the invention. As another example, the function of parsing and rendering an HTML document could be built into the code of the control as opposed to being implemented as an OLE document object.

In view of the many possible embodiments to which the principles of our invention may be applied, it should be recognized that the implementation described above is only one possible implementation and should not be taken as a limitation on the scope of the invention. Rather, the scope of the invention is defined by the following claims. We therefore claim as our invention all that comes within the scope and spirit of these claims.

What is claimed is:

1. A method for invoking a web browser from within an application program executing on a computer, the method comprising:

in response to a request from an application program to create an instance of a web browser control, creating the instance of the web browser control;

in a server program of the web browser control, processing requests from the application program to invoke member functions on a programming interface of the web browser control for the instance of the web browser control;

when the application program invokes a navigate member function on the programming interface instructing the instance of the web browser control to navigate to a specified address on a computer network, executing the navigate member function in the server program to retrieve a first document at the address from the computer network, and saving the specified address in a navigation stack of the instance of the web browser control;

when the application program invokes a member function on the programming interface instructing the instance of the browser control to move to an entry in the navigation stack, executing the member function in the server program to request a second document associated with the entry in the navigation stack.

2. The method of claim 1 wherein the server program executing in the computer displays the first document in a window of the application program on a display screen of the computer associated with the instance of the web browser control in response to the navigate member function.

3. The method of claim 2 further including displacing the second document in the window in response to a go forward member function; and displaying a third document in the window in response to a go backward member function, where the go forward and go backward member functions move one entry forward and backward, respectively, in the navigation stack.

4. The method of claim 1 further including:

in response to requests to create more than one in stance of the browser control, creating separate instances of the browser control, each having a separate display frame on a display monitor and each simultaneously displaying different HTML documents retrieved from the computer network, wherein each separate instance of the browser control is responsive to function calls from the application program to each of the member functions.

5. The method of claim 1 further including:
from the server program executing on the computer, issuing a new window event to the application program to tell the application program to create a new window to display a document retrieved from the computer network.

6. The method of claim 1 further including:
from the server program executing on the computer, issuing a download begin event to the application program to tell the application program that the server program is beginning to download a document from the computer network for the instance of the browser control; and
from the server program, issuing a download complete event to the application program to tell the application program that the server program has completed downloading the document from the computer network.

7. The method of claim 1 further including:
from the server program executing on the computer, issuing a navigate begin event to the application program to tell the application program that the server program is about to navigate to a URL on the computer network on behalf of the instance of the browser control; and
from the server program, issuing a navigate complete event to the application program to tell the application program that the server program has completed navigating to the URL.

8. The method of claim 1 further including:
in response to a request to create a second instance of the web browser control from the application program, creating the second instance of the web browser control;
displaying a first HTML page in a display frame of the first instance of the browser control; and
displaying a second HTML page in a display frame of the second instance of the browser control;
when a user activates a targeted link in the first HTML page, displaying output of the targeted link in the display frame of the second instance of the browser control, wherein each separate instance of the browser control is responsive to function calls from the application program to each of the member functions.

9. The method of claim 8 wherein the step of displaying the output of the targeted link includes:
locating a target frame in the display screen for the targeted link by searching current frames to find a frame having a frame name of the target frame;
and displaying the output of the targeted link in the display frame of the second instance of the browser control such that the first instance communicates with the second instance of the browser control to display the output without using the application program to perform the targeted link.

10. The method of claim 1 further including:
from the server program executing on the computer, issuing a progress change event to the application program to indicate when progress of a download of a resource from the computer network changes.

11. The method of claim 1 wherein the server program is dynamically linked with the application program at run time and runs in a same process as the application program.

12. The method of claim 1 wherein the instance of the web browser control displays the first, and second documents in a user interface window created by the application program.

13. The method of claim 12 further including:
creating a second instance of the web browser control;
when the application program invokes the navigate method for the second instance of the browser control and specifies an address of a third document, retrieving the third document from the computer network; adding the address of the third document on a navigation stack associated with the second instance of the browser control, and displaying the third document in a second user interface window created by the application program for the second instance of the browser control.

14. The method of claim 1 further including:
in the application program, creating separate windows in a display screen of the computer;
in the application program, creating instances of the web browser control, where each instance of the web browser control corresponds to one of the application program's windows; and
simultaneously displaying separate HTML documents retrieved by the server in the windows.

15. The method of claim 1 wherein the first document is an HTML document and is encapsulated in the instance of the browser control such that the encapsulated document is accessible to the application program via the programming interface, and further including:
from the application program, adding code to the HTML document to modify the HTML document and displaying the modified document in a window of the application program.

16. A web browser control comprising:
a navigation stack for storing navigation history of the web browser control; and
a server program with application programming interface methods including:
a navigate member function for retrieving a HTML document at a specified address on a computer network, for rendering the HTML document, for storing the specified address on the navigation stack, and for displaying the document in a window on a display screen of a computer;
a go forward member function in communication with the navigation stack for navigating to a subsequent address relative to the current address in the navigation stack; and
a go backward member function in communication with the navigation stack for navigating to a previous address relative to the current address in the navigation stack.

17. The web browser control of claim 16 wherein the server program is operable to create instances of the web browser control, and wherein each instance of the web browser control is accessible to a host application program through the application programming interface methods of the server program.

18. The web browser control of claim 16 wherein the application programming interface includes a refresh member function for refreshing a current HTML document displayed on the display screen of the computer.

19. The web browser control of claim 16 wherein the application programming interface includes a stop member function for halting a navigation or download of a current HTML document.

20. The web browser control of claim 16 wherein the application programming interface includes a refresh member function for refreshing a current HTML document displayed on the display screen of the computer, and a stop member function for halting a navigation or download of an HTML document.

21. A computer-readable medium having computer-executable instructions for performing steps comprising:

in a web browser control program, processing requests from an application program to invoke member functions on an Interface of the web browser control for an instance of the web browser control;

when the application program invokes a navigate member function on the interface instructing the instance of the web browser control to navigate to a specified address on a computer network, retrieving a first document at the address from the computer network, and saving the specified address in a navigation stack of the instance of the web browser control;

when the application program invokes a member function on the interface instructing the instance of the browser control to move forward or backward to an entry in the navigation stack, retrieving a second document associated with the entry in the navigation stack.

* * * * *

UNITED STATES PATENT AND TRADEMARK OFFICE
CERTIFICATE OF CORRECTION

PATENT NO. : 6,101,510

DATED : August 8, 2000

INVENTOR(S) : Stone et al.

Page 1 of 2

It is certified that error appears in the above-identified patent and that said Letters Patent is hereby corrected as shown below:

On the cover page, in the Assignee city and state, "Redmond, Mass." should read --Redmond, Wash.--.
Column 1, line 66, "network HTTP" should read --network. HTTP--.
Column 2, line 40, "ii" should read --it--.
Column 2, line 44, "it any" should read --if any--.
Column 6, line 10, "function, that" should read --functions that--.
Column 6, lines 20-23, "
| Name of Member | Description |
|---|---|
| Function | |

"
should read
--
| Name of Member | Description |
|---|---|
| Function | |

--.

UNITED STATES PATENT AND TRADEMARK OFFICE
CERTIFICATE OF CORRECTION

PATENT NO. : 6,101,510
DATED : August 8, 2000
INVENTOR(S) : Stone et al.

Page 2 of 2

It is certified that error appears in the above-identified patent and that said Letters Patent is hereby corrected as shown below:

Column 22, line 60, "For example" should read --For example,--.
Column 23, line 31, "to e" should read --the--.
Column 24, line 55, "displacing" should read --displaying--.
Column 27, line 9, "Interface" should read --interface--.

Column 6, line 49, "in Table 3" should read --in Table 2--.
Column 7, line 24, "bar a) region" should read --bar (a region--.
Column 7, line 62, "is located" should read --is located.--.
Column 8, line 47, "and renderings an" should read --and rendering an--.
Column 9, line 20, "document 50" should read --document 60--.
Column 9, line 47, "applicator" should read --application--.
Column 10, line 54, "Brockschrnidt" should read --Brockschmidt--.
Column 11, line 45, "p)inter" should read --pointer--.
Column 11, line 51, "Interface" should read --pInterface--.
Column 11, line 58, "IviewObject2," should read --IViewObject2,--.
Column 12, line 12, "program 100 which" should read --program which--.
Column 12, line 63, "object or a class" should read --object of a class--.
Column 17, line 37, "i he" should read --the--.
Column 18, line 2, "a fill refresh" should read --a full refresh--.
Column 18, line 17, "t he" should read --the--.
Column 20, line 30, "This s" should read --This is--.
Column 21, line 66, "HT documents" should read --HTML documents--.
Column 22, line 4, "along, with" should read --along with--.
Column 22, line 6, "IEF=" should read --HREF--.
Column 22, line 13, "we)" should read --web--.

Signed and Sealed this

Twenty-ninth Day of May, 2001

Attest:

Attesting Officer

NICHOLAS P. GODICI

Acting Director of the United States Patent and Trademark Office